May 19, 1942.  P. HEFTLER  2,283,629
DIE SET FOR MAKING METAL-EDGE FILTERS
Filed May 27, 1940   4 Sheets-Sheet 1
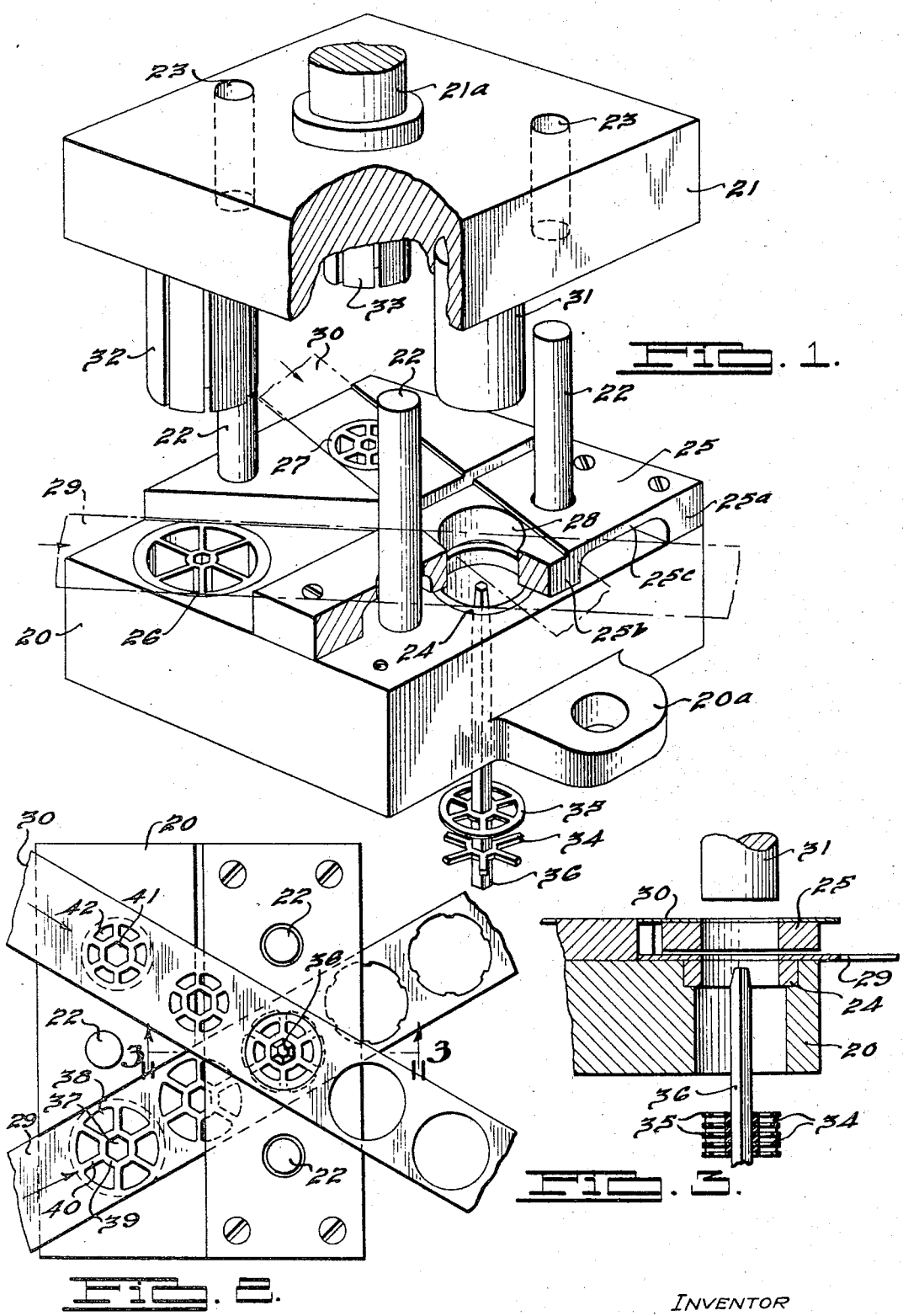
INVENTOR
Paul Heftler

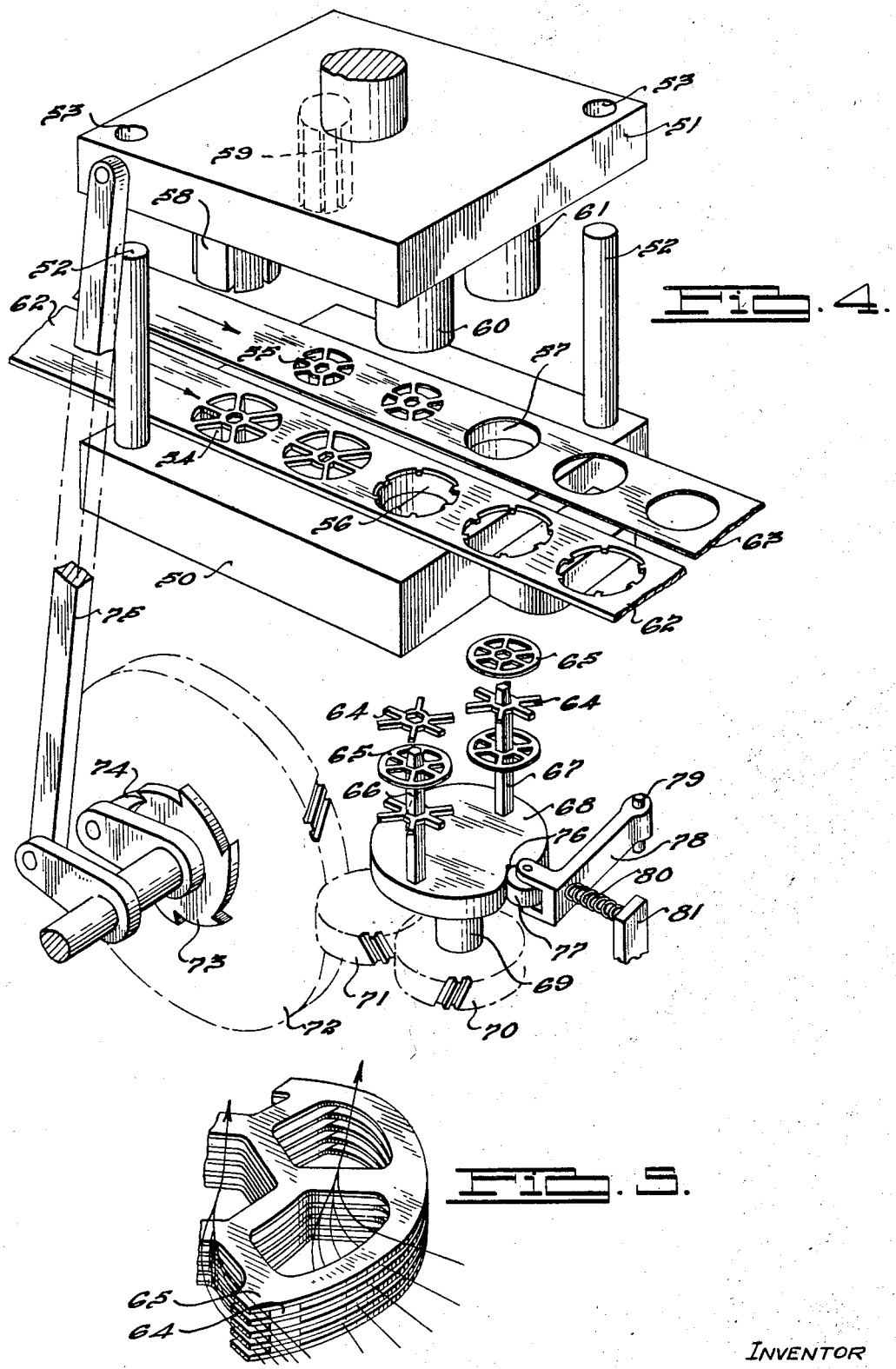

May 19, 1942. P. HEFTLER 2,283,629
DIE SET FOR MAKING METAL-EDGE FILTERS
Filed May 27, 1940 4 Sheets-Sheet 3
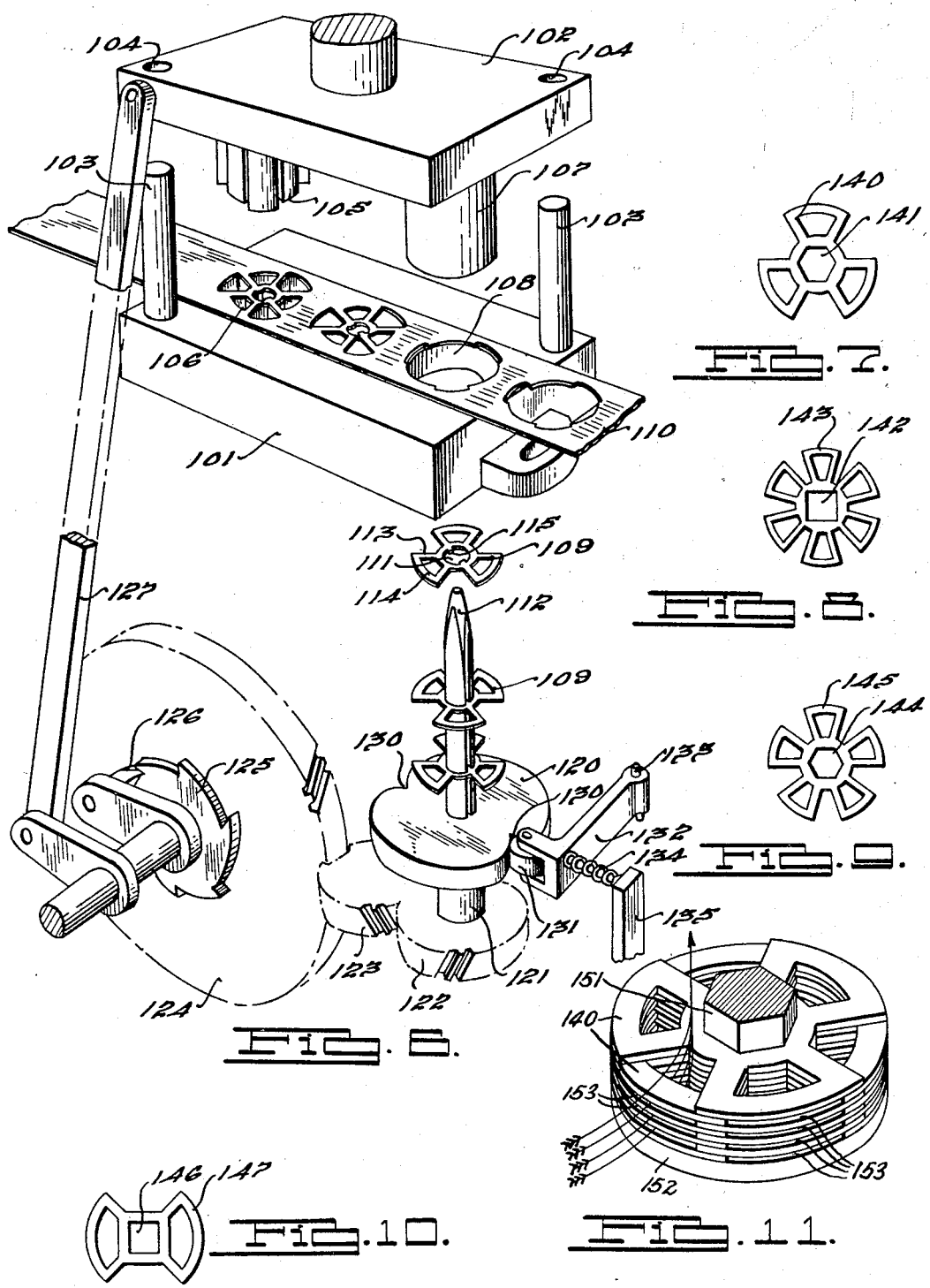
INVENTOR
Paul Heftler May 19, 1942.　　　　P. HEFTLER　　　　2,283,629
DIE SET FOR MAKING METAL-EDGE FILTERS
Filed May 27, 1940　　　　4 Sheets-Sheet 4
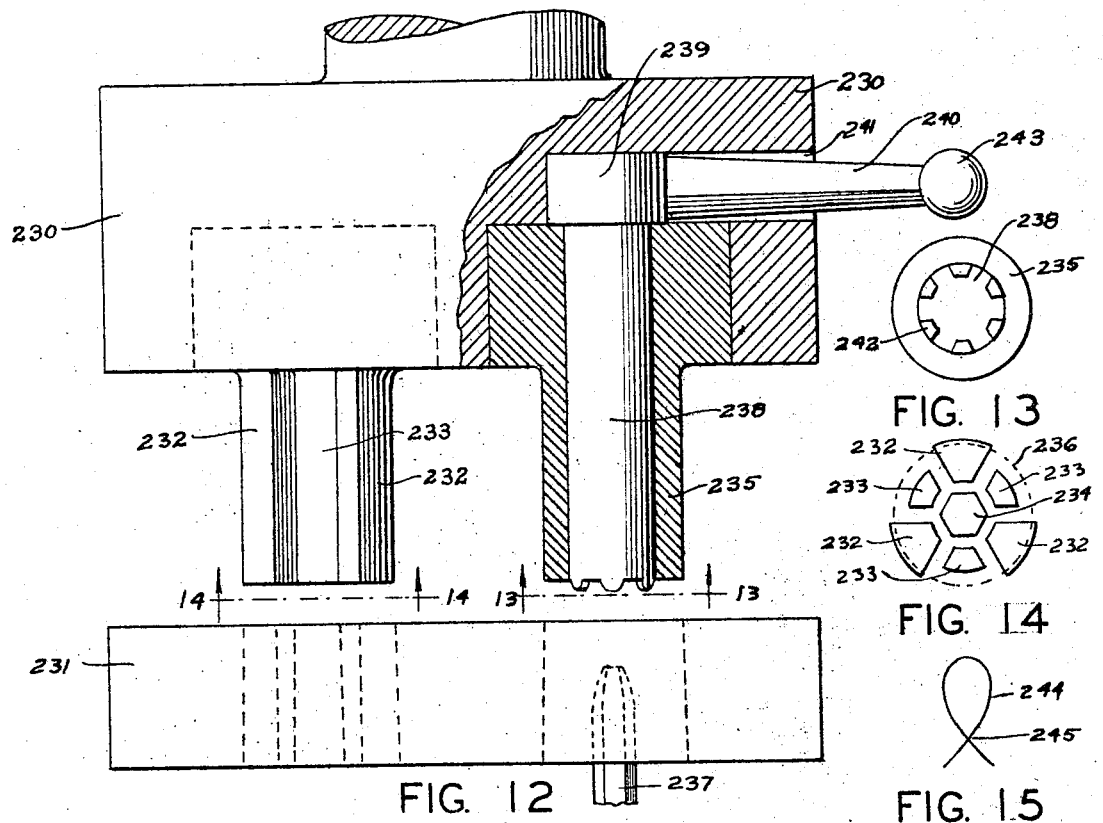
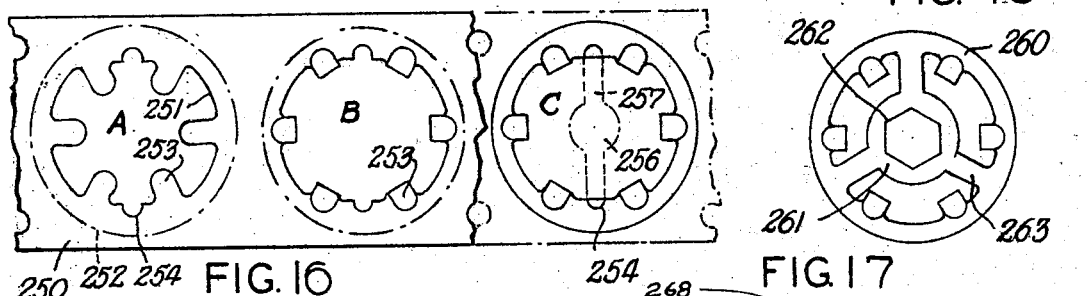
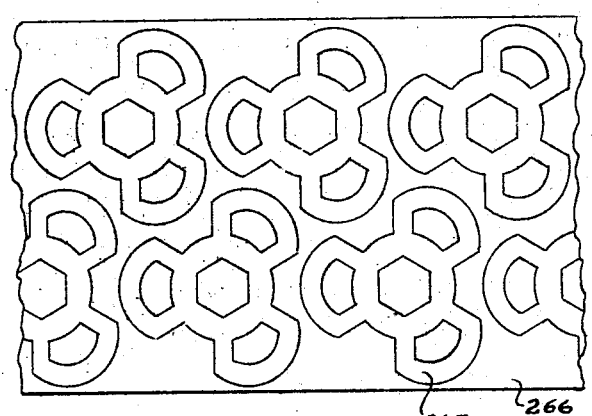
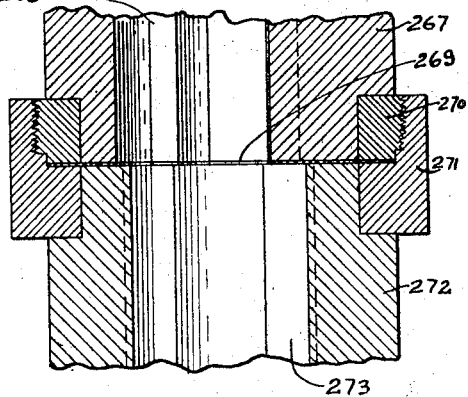
INVENTOR
Paul Heftler Patented May 19, 1942

2,283,629

UNITED STATES PATENT OFFICE 2,283,629

DIE SET FOR MAKING METAL-EDGE FILTERS

Paul Heftler, Chicago, Ill.

Application May 27, 1940, Serial No. 337,407

25 Claims. (Cl. 164—21)

This invention relates to punch press tools for forming and stacking, in the proper arrangement, washers of special shapes in order to form so-called "edge filters" such as are shown in United States Letters Patent #1,641,485 to Victor R. Heftler and #1,977,174 to Matthew O. Crawford, and marketed under the trade-mark "Zenith." Filters of this type made under the above-mentioned patents have achieved considerable commercial success, being used as standard equipment on refrigerators, marine engines, tractor engines, Diesel engines, truck engines, and expensive passenger car engines, but their more general adoption is limited by their cost.

One of the principal objects of this invention is to provide automatic or mechanical means for forming and stacking the washers or stampings which form the essential elements of this type of filter, thus lowering their cost.

Another object of this invention is to provide methods of forming and assembling the above-mentioned washers, the method being particularly adapted to being carried out mechanically.

Another object of this invention is to provide shapes of washers for forming filters of the general type referred to and particularly adapted to be formed and assembled by one of the methods mentioned above and described below.

Another object of this invention is the provision of means for forming and stacking the pieces comprising filters of the above-described general type but having some pieces thicker than others.

Another object of this invention is to provide a filter stack in which every element is identical with every other element, excepting of course the stem and the end washers, and in which the elements are formed of thin sheet metal and in which the bulk of the metal in each element has not been deformed during the formation of the element from the thin sheet metal.

Other objects of this invention will appear in the following description and appended claims, reference being had to the accompanying drawings forming a part of this specification, wherein like reference characters designate corresponding parts in the several views.

In the drawings,

Fig. 1 is an isometric view of one of the preferred embodiments of my invention, with the parts separated to more clearly show the structure;

Fig. 2 is a plan view of part of the embodiment shown in Fig. 1;

Fig. 3 is a section on the line 3—3 of Fig. 2, taken in the direction of the arrows;

Fig. 4 is an isometric view of a second embodiment of my invention, with the parts separated to more clearly show the structure;

Fig. 5 is an enlarged view of a portion of one form of filter stack produced by my invention;

Fig. 6 is an isometric view of a third form of my invention, with the parts separated to more clearly show the structure;

Figs. 7 to 10 are plan views showing four forms of filter stack element especially adapted to be made and assembled by the form of my invention shown in Fig. 6; and Fig. 11 is a view of a portion of a filter stack made by the method illustrated in Fig. 6 and composed of washers of the type illustrated in Fig. 7.

Fig. 12 is a side elevation, partly in section, of another die set for making and assembling filter stacks;

Fig. 13 is a view looking up in the direction of the arrows from the line 13—13 in Fig. 12;

Fig. 14 is a view looking up in the direction of the arrows from the line 14—14 in Fig. 12;

Fig. 15 is a diagram illustrating the motion of one of the parts of the die set shown in Fig. 12;

Fig. 16 is a plan view illustrating the successive steps in making a layer for another form of filter stack.

Fig. 17 is a plan view of a layer for still another form of filter stack.

Fig. 18 is a view of the washers for still another form of filter stack laid out on a strip of stock from which they are to be punched; and Fig. 19 is a section through a part of a machine for assembling the washers shown in Fig. 18 into a filter stack.

Before the present invention is explained in detail, it is to be understood that the invention is not limited in its application to the details of construction and arrangement of parts illustrated in the accompanying drawings, since the invention is capable of other embodiments and of being practised or carried out in various ways. Also, it is to be understood that the phraseology or terminology employed herein is for the purpose of description and not of limitation, and it is not intended to limit the invention beyond the terms of the several claims hereto appended as considered in view of the prior art and the requirements thereof.

In so-called "progressive dies," the work to be performed is divided into several operations, and the material is fed, by hand or automatically, so that it is successively submitted to the various operations. During these operations, the piece remains fixed to the mother stock while it is moved from one station to the next, and it is only at the final station, usually called the "blanking out" station, that the final ties are sheared and the completed piece falls through the blanking dies. The die sets hereinafter described work on this general principle.

The die set shown in Figs. 1 to 3 comprises a die holder 20 and an upper bolster plate or punch holder 21 adapted to be secured to the bolster plate and to the ram, respectively, of an ordinary punch-press of suitable size. For this purpose, the die holder 20 is provided with lugs 20a and the bolster plate 21 is provided with a shank 21a. The die holder 20 is provided with three guide posts 22 which are adapted to fit into guide holes 23 in the punch holder 21 when the tool is assembled. The die holder 20 carries four dies 24, 25, 26, and 27, two of which (24 and 25) are blanking dies. One of the blanking dies 24 is set into the surface of the die holder 20. The other blanking die is in the form of a long plate with feet 25a at its ends secured to the top of the die holder 20. The central portion 25b of the blanking die 25 is thickened so that its lower surface almost touches the upper surface of the die holder 20. This central portion 25b contains a blanking aperture 26 which is directly above the blanking aperture in the lower blanking die 24.

The two pattern dies 26 and 27 are set in the die holder 20 at one side of the blanking dies 24 and 25 and at two different levels, one at the same level as the lower blanking die 24 and the other in a raised portion of the die holder so that it is at the same level as the upper blanking die 25. With this arrangement there are two paths for two strips of stock 29 and 30. The path for one strip 29 passes over the pattern die 26 and then between the two blanking dies 24 and 25. The path for the other strip 30 is over the raised portion of the die holder 20 and over the upper blanking die 25 and at an angle to the first path, passing over the other pattern die 30 and the aperture 28 in the upper blanking die 25.

The upper bolster plate or punch holder 21 carries three punches, a blanking punch 31 and two pattern punches 32 and 33. The blanking punch 31 is arranged so that at each stroke of the press it passes right through the upper blanking die 25 and into the lower blanking die 24, punching out pieces from both the upper and lower strips 30 and 29. Thus one punch 31 cooperates with two dies 24 and 25, while the two pattern punches 32 and 33 are each arranged to cooperate with one of the pattern dies 26 and 27.

In operation, the two strips of stock 29 and 30 are fed step by step in the direction shown by the arrows in the figure by a suitable push or roll feed. The die set is designed and the feeds adjusted so that the patterns 34 and 35 punched out by the pattern punches 32 and 33 come directly over the blanking dies 24 and 25 at a later stroke of the press. In the particular embodiment shown in the drawing, this occurs two strokes later. Thus, at each stroke of the press two patterns are punched out at the pattern dies 26 and 27 and two other previously formed patterns 34 and 35 are blanked out at the blanking dies 24 and 25 and drop down onto a hexagonal stem 36 placed immediately below the blanking dies 24 and 25.

As the two pieces blanked out at one stroke of the press have their patterns formed by different dies, these two patterns can be different. This is the important feature of this tool. In the embodiment of the invention shown, the pattern formed in one strip of stock 29 by one of the pattern dies 26 and its corresponding punch 32 comprises a central hexagonal hole 37 and six holes 38 similar to sectors of a circle around the hexagonal hole. As shown in Fig. 2, this leaves a central ring 39 of stock joined to the remainder of the strip of stock 29 by six radiating arms 40. When the pattern thus formed reaches the blanking dies 24 and 25, the punch 31, whose diameter is a little smaller than the outer diameter of the pattern, cuts off each of the six arms 40 near its outer end, and the piece 34 thus separated from the stock 29 drops down onto the tapered hexagonal stem 36.

The pattern formed at the other pattern die 27 is similar to the one formed at the pattern die 26, having a hexagonal hole 41 and six segmental holes 42 around it. In this pattern, however, the segmental holes are considerably smaller than in the first pattern, so that the over-all diameter of the pattern is smaller than the over-all diameter of the blanking punch 31. Therefore, when this pattern reaches the blanking die 25, the disk 35 punched out contains the entire pattern, so that it has the general appearance of a wheel. Thus, at each stroke of the press, a wheel piece 35 and a star piece 34 are punched out, and these pile up on the stem 36 in alternate order, forming the filtering element or filter stack shown in Fig. 5 and similar to the well-known "Zenith" type of edge filtering element, shown in United States Patent No. 1,641,435 issued to Victor R. Heftler.

It will be noted that when the punch 31 reaches the lower blanking die 24, its face is covered by one of the wheel pieces. At first thought, it would appear that this would interfere with the action of the punch and die, but it has been found in practice that the wheel piece on the face of the die, even though soft, satisfactorily punches out the star piece.

In punching out the wheel pieces, the upper blanking die 25 yields slightly until it rests upon the top of die holder 20. This yielding is permitted by the thin parts 25c of the die 25 between the feet 25a and the thick center portion 25b. With this arrangement a solid support is secured for the upper blanking die 25 without the necessity of making it very heavy.

The tool shown in Fig. 1 lends itself very well to the production of a type of filter which hitherto could be assembled only by hand. This is a filtering element in which the wheels and stars are of different thicknesses. For example, if a filter of not extreme fineness is desired, the stars can be punched out of stock .004 inch thick, while the wheels are punched out of stock only .002 inch thick, so that almost two-thirds of the area of the side of the filtering stack will be apertures. This gives considerably more filtering capacity in a given size of stack than can be had with the conventional type of "Zenith" filter.

It is obvious that many modifications of this die set may be made. For example, the upper blanking die 25 may be omitted and the pattern die 27 placed just above the level of the pattern die 26 and the blanking die 24, as shown in my Patent No. 2,260,899 entitled "High speed method of making metal-edge filters." With this arrangement, the two strips of stock 29 and 30 will lie one directly on top of the other where they cross over the blanking die 24 and the two pieces will be blanked out simultaneously on the one die. A different type of stack for some other purpose than filtering may require pieces of three or more different shapes. For this purpose, a die having three or more stories, instead of only two stories as shown, may be made.

The embodiment of the invention shown in Fig. 4 comprises a die holder 50 and punch holder 51 adapted to be secured to the bolster and the ram of a suitable punch press. The die holder 50 and the punch holder 51 are guided with respect to each other by guide posts 52 which fit into and slide in guide holes 53. The die holder 50 carries two pattern dies 54 and 55 and two blanking dies 56 and 57. Pattern punches 58 and 59 and blanking punches 60 and 61 are carried by the punch holder 51 and are positioned so as to cooperate with the dies 54, 55, 56, and 57 in the conventional manner. The punches and dies 54 to 61 are arranged to act upon two strips of stock 62 and 63, which are fed through the tool step by step in parallel paths by a conventional push or roll feed mechanism. The punches and dies are arranged so that each strip is acted upon by one pattern punch and die and one blanking punch and die, the strip being fed forward so that the pattern which is punched at one stroke of the press is blanked out of the strip at a later stroke. In the particular embodiment of the invention illustrated, the patterns are similar to the patterns formed by the die set shown in Fig. 1. Thus, at each stroke of the press, one star piece 64 and one wheel piece 65 are blanked out and fall upon the hexagonal stems 66 and 67.

The desired alternate arrangement of star pieces and wheel pieces is secured by shifting each of the stems 66 and 67 from one side to the other, so that each one is first under the die 56 which blanks out a star piece and then under the die 57 which blanks out a wheel piece. Any suitable means for accomplishing this result can be used, the one shown being merely illustrative. It consists of a disc 68 which is carried by a shaft 69 driven through gearing 70, 71, and 72 from a ratchet and pawl mechanism 73 and 74. The pawl 74 is connected to the punch holder 51 or to the ram of the press, so that, at each stroke of the press, it moves enough to cause the stems 66 and 67 to interchange their positions.

While only one form of this embodiment of the die set has been shown, many variations are obviously possible. For instance, the two strips 62 and 63 may be a single strip, if it is not desired to make the wheel and star pieces of different thicknesses. There may be more than two such strips if the stack to be made consists of more than two different types of filter stack elements. The table 68 has, for the purpose of simplicity, been shown as carrying only two stems 66 and 67, but obviously the table may be made larger and a larger number of stems be used. If this is done, the machine will require less frequent attention upon the part of the operator. If a high production tool is desired, the die set may be designed with several sets of pattern punches and dies and blanking punches and dies arranged to act upon several strips of stock placed in lines radiating from the axis of the shaft 69 and table 68. In such a case, the table of course will carry a much larger number of pins like the pins 66 and 67, so that there will always be one pin under each of the blanking dies.

The third embodiment of my invention, shown in Fig. 6, comprises a die holder 101 and a punch holder 102, adapted to be secured to the ram and bolster of a conventional punch press. These are guided with respect to each other by conventional guide posts 103 secured to the die holder 101 and sliding in holes 104 in the punch holder 102. This form of tool has only a single pattern punch 105 and die 106, and a single blanking punch 107 and die 108. For this reason, the pieces 106 formed by the tool from the strip 110, as it is fed through step by step by the usual push or roll feed, will all be alike. Obviously then, the form of filter shown in Fig. 5, that is, the one composed of wheels and stars, cannot be produced by this machine. Instead, the filter stack is made of pieces similar to those shown in Patent No. 1,694,939 to Victor R. Heftler. These pieces, which are of what is called a "cloverleaf pattern," are similar to a wheel having an even number of spokes and having portions of the rim between the spokes removed. If these pieces 109 are stacked up so that the portions of the rim of one piece bridge the gaps in the rims of the pieces immediately above and below it, a second form of the well-known "Zenith" type of filtering element will be produced. It has hitherto been the practice to secure this relation between superimposed pieces by varying the orientation of the gaps in the rim with respect to the central hole. I have found that if a certain relation is kept between the symmetry of the central hole 111 and the symmetry of the arrangement of the pieces of rim 114, identical pieces can be stacked up to secure the desired construction. The pieces or washers 109 shown in Fig. 6 each have a central hole 111 with two inwardly projecting lugs 115 so that the final assembly of the filter stack can be made as shown in the United States Patent No. 1,977,174 to Matthew O. Crawford. These washers can fit upon a stem 112 in two ways, each rotated one-half turn with respect to the other. There are six spokes 113 joined by three segments of rim 114, giving the "cloverleaf" piece three "leaves." With this particular arrangement, the washers 109 will stack up as desired, if each is given one-half a turn before it is added to the pile of previously formed washers.

Instead of rotating the washers 109 as they are formed and added to the stack of previously formed washers, the same result is produced by rotating the stack. For this purpose the stem 112 is mounted at the center of a table 120 carried by a shaft 121. Mechanism is provided for rotating this shaft one-half a turn at each stroke of the press. This may be of any form desired, but for the purposes of illustration, I have shown gears 122, 123, and 124 driven through a ratchet 125 and pawl 126 from a connection 127 to the punch holder 102. The table 120 is provided with two diametrically opposed notches 130 for receiving an indexing roller 131. The roller 131 is carried by an arm 132 mounted on a pivot 133 and pressed toward the table 120 by a spring 134 which bears against the arm 132 and a fixed abutment 135. This ensures that the table 120 and pin 112 stop in the correct orientation.

The form of die set shown in Fig. 6 and the method of forming and assembling filter stacks carried out by that machine may obviously be used with other shapes of filter stack elements. Figs. 7 to 10 show such elements.

The piece shown in Fig. 7 has three leaves 140 like the piece 109 shown in Fig. 6, but the central hole 141 is hexagonal instead of being round and provided with projecting lugs 115 as in the piece 109. With this form of central hole, a hexagonal stem, similar to those employed in the die set shown in Figs. 1 and 4, is employed, and the hexagonal stem is given either one-sixth, one-half, or five-sixths of a revolution at each stroke of the die set. Any of these fractional turns will obviously serve to give the proper relation between successive filter stack elements, and a portion of the filter stock will appear as shown in Fig. 11.

The form of filter stack element shown in Fig. 8 has six leaves 143 and a square central hole 142. In a die set for forming and stacking this element, the stem will be square and will be given one-quarter or else three-quarters of a revolution at each stroke of the set.

The form of filter stack element shown in Fig. 9 has a hexagonal central hole 144 and five leaves 145. This form must be stacked with one-half a revolution of the hexagonal stem of the die set at each stroke.

The filter stack element shown in Fig. 10 is similar to the one shown in Fig. 8, in that it is provided with a square central hole 146 to receive a square stem which must be given either one-quarter or three-quarters of a revolution at each stroke of the tool. It is provided, however, with only two leaves 147.

One form of filter stack produced by the method and the type of apparatus illustrated in Fig. 6 is shown in Fig. 11. This filter stack is made with the three-lobed "clover-leaf" washer shown in Fig. 7. It comprises a conventional hexagonal central stem 151 and solid bottom washer 152 as in the standard "Zenith" filter shown in the U. S. Patent No. 1,641,485 mentioned at the beginning of this specification. The stem 151 and bottom washer 152 hold the washers 140 forming the body of the filter stack in the usual manner, as shown in the above-mentioned patent, but the washers 140, instead of being of two different types in alternating arrangement as in the older type of filter, are all identical as to outline and as to which side they have up. They differ only in that each washer 140 is rotated one-sixth of a turn or sixty degrees with respect to the two washers immediately above and below. This relative rotation places the lobes of one washer in line with the gaps between the lobes of the adjacent washers and produces the slots 153 shown in the drawing.

The advantage of this type of filter stack having all the washers alike and with the same side up is that they can all be produced in the same dies and can be assembled as they fall from the blanking die without any of them having to be turned over. Even in cases where the number of a particular size of filter stack to be made is so small as to make it advisable to assemble them by hand rather than to provide the arrangement shown in the lower part of Fig. 6, this form of filter stack still presents a great advantage over previous forms. In such a case, a stack of washers can be placed, for example, on the round portion of a rod having both round and hexagonal portions and the washers slid one at a time onto the hexagonal portion, each washer being rotated to the proper position as it is moved over. It will therefore be obvious that this form of filter is more economical to produce in small quantities and in any quantity that is not large enough to wear out a single set of dies in which the pattern punching is all done by the same dies as in Fig. 6, instead of being divided up as in Figs. 1 and 4.

It will also be understood that the particular form of filter stack shown in Fig. 11 is given merely as an example and that the broad invention embodied in this filter stack can be embodied in other forms of filter stack made with other forms of washers, such as those shown in Figs. 8, 9 and 10 and others which may be devised by the skilled mechanic or which may even involve further invention as long as they are included within the terms of any one or more of the appended claims relating to this form of filter.

Still another method of forming a filter stack, this filter stack being of the type shown in Fig. 11, is illustrated in Figs. 12 to 15. This method is carried out with a die set that resembles, in many respects, the die set shown in Fig. 6. It includes a punch holder 230 and a die 231 having the conventional guides, not shown in the drawing, and arranged to be mounted in a punch press. The punch holder 230 carries a set of pattern punches 232—233—234 arranged to punch 6 outer holes similar to those punched by the pattern punch 105 in Fig. 6 and a central hexagonal hole. The blanking out is done by a circular punch 235 whose size relative to the pattern punches 232—233—234 is shown by the dotted circle 236 in Fig. 14. In using this apparatus and carrying out the process, a strip of stock is first operated on by the pattern punches, and then the part of the stock pierced by the pattern punches is moved over under the blanking out punch 235 and punched out. It will be seen from Fig. 14 that the washer thus formed will have the shape shown in Fig. 7 and will be formed in substantially the same way as the washers 109 are formed in the die set shown in Fig. 6, the only difference being that the washer formed in the die set shown in Fig. 12 will have a hexagonal central hole instead of a two-lobed central hole.

The stacking of the washers blanked out by the punch 235 takes place on a conventional hexagonal stem 237 extending up into the die 231 co-axially with the blanking out punch 235. The sides of the hexagonal stem 237 are not parallel to the sides of the hexagonal holes in the washers as they are blanked out but are at an angle of thirty degrees to them, thus each washer has to be rotated through an angle of thirty degrees in one direction or the other before it will slide down on the hexagonal stem 237. This rotation is accomplished by a rotator 238 which is rotatably mounted within the punch 235 and the punch holder 230. The head 239 of the rotator 238 is provided with an arm 240 screwed into it and extending out through a slot 241 in the punch holder 230.

The bottom of the rotator 238 is formed with six bosses or projections 242 which are adapted to fit loosely between the radial spokes of the washer 140. As the punch 235 and the rotator 238 come down upon the washer to be punched out, the projections 242 on the rotator fit down into the pattern of punched holes, and, after the washer is punched out, and while the punch 235 and the rotator 238 are still moving down, the rotator 238 turns through an angle of thirty degrees. This turns the washer so that it can slide down onto the hexagonal stem 237.

In order to secure the desired stacking of the washers in alternate relation, the successive washers are rotated in opposite directions so that a filter stack like the one shown in Fig. 11 is produced.

The turning of the rotator 238 in opposite directions is secured by connecting the ball 243 on the end of the rotator arm 240 to a crank which rotates at a speed which is 1½ times as great as the speed of the crank shaft operating the punch press in which the die set is mounted. The link connecting the ball 243 to the crank extends in a generally horizontal direction and is ball-and-socket jointed at both ends in order that the necessary movement of the parts may take place without binding. The resultant motion of a point on the rotator 238, such as one of the lugs 242, is shown by the line 244 in Fig. 15, this motion being the combination of two simple harmonic motions acting at right angles to each other and having a relative frequency of three and two. The point 245 where the line of motion 244 crosses itself corresponds to the instant when the punch 235 is about to blank out the finished washer. It will thus be seen that the rotator 238 enters each of the washers in the same position but that it is turning in alternate directions for alternate washers.

A process of making another form of filter stack is illustrated in Fig. 16. In this process, a continuous strip of stock 250, which may be .002 in. thick, is moved step by step through three or more stations. At the first station A, a hole 251 of peculiar shape is punched in the strip of stock, the hole 251 being concentric with the location of the as-yet-unformed periphery 252 of the finished washer. It will be noted that the hole 251 is of such a shape as to leave six tongues 253 projecting in radially and that it also provides two diametrically opposite notches 254.

At the second station B, the tongues 253 are folded over flat onto the top of the strip 250 so as to provide a double thickness of metal at six points around the future washer. The folding over of the tongues 253 may, if desired be performed in two or more steps at two or more stations, but it has been shown as being performed at a single station in order to simplify the drawing.

At the last station C, the completed washer 255 is blanked out of the strip 250 and is placed on a central stem 256. The stem 256 is formed with oppositely extending wings 257 whose outer edges fit into the notches 254 of the washers, thus holding the washers in alignment with the folded-over tongues or spaces 253 of each washer directly above the folded-over tongues or spacers of the washers below. The completed filter stack is shown in detail in Figure 8 of my Patent No. 2,260,899 referred to above, and it is mounted in a filter head of the conventional type, such as the one shown in that patent.

The process illustrated in Fig. 16 may be varied by employing it to make washers of the design shown in Fig. 17. The washer 260 shown in that figure differs from the washer 255 shown in Fig. 16 only in that it is provided with a central portion 261 having a central hexagonal hole 262 and connected to the main portion of the washer by spokes 263. This form of washer is mounted in a stack on a conventional hexagonal stem like the stem 151 shown in Fig. 11.

Still another method of producing filter stacks is illustrated in Figs. 18 and 19. In this method, a large number of filter washers 265 of the cloverleaf pattern are punched out of a strip of stock 266 and are placed in preliminary stacks with the lobes of the washers in line with each other. It will be noted that the washers 265 are of a special shape in that the outer edges of the three lobes of each washer form parts of three separate circles rather than forming parts of a single circle as in the washer 140 shown in Fig. 7. The stack or pile of washers 265 is placed in the upper portion 267 of a stacker, this portion being formed with a cylindrical hole 268 having exactly the same shape as the washers 265. At the bottom of the stacker top 267, there is a thin metal rotator 269 which is fixed in a rotatable ring 270—271. The rotator 269 has a hole that has exactly the same shape as the hole 268 and its thickness is the same as that of a washer so that, when the rotator 269 is lined up with the hole in the stack holder 267, the bottom washer in the stack will fit down into the rotator 269.

Immediately below the rotator 269 is a receiver 272 which is formed with a six-fluted hole adapted to receive the finished stack. In cross section, the outline of the hole 273 in the receiver 272 is the same as the joint outline of two washers 265 placed one on top of the other but with one washer rotated sixty degrees with respect to the other. The receiver 272 is not placed so that it will receive a washer directly from the stack holder 267 but is turned thirty degrees from that position. Thus, a washer which falls into the rotator 269 will not fall through into the receiver 272 until the rotator 269 is turned through an angle of thirty degrees from its original position. When the rotator 269 is turned thus, the washer within it falls down into the receiver 273, but another washer does not fall into the rotator 269 until the rotator is turned back to its original position in line with the holder 267. The rotator 269 is then turned thirty degrees in the opposite direction so that the next washer drops down into the receiver 272 after it has been turned sixty degrees with respect to the previous washer. Thus the washers 265 are fed into the receiver 272 in alternate relation so as to form a filter stack similar to the one shown in Fig. 11. The stack will differ from the stack shown in Fig. 11, however, in that it will be fluted instead of round, the fluted form of the stack serving to prevent it from turning within the holder 272.

Another advantage of the fluted form of stack is that it provides a greater filtering area and in that it permits the washers which form it to be spaced more closely together on the strip of stock 266 from which they are punched. By using this form of washer and by blanking them out with a punch having the same outline as the washer instead of a circular outline as in Figs. 6 and 12, a great economy of material may be effected. As may be seen from Fig. 18, the washers may not only be spaced closer together but several rows of washers may be punched from a wide strip and the rows placed very close together.

While the processes and machines or devices for carrying them out have been described very briefly above and only their essentials have been illustrated, the skilled toolmaker will have no difficulty in carrying out the inventions. In the various die sets, the necessary pilot punches and pilot pins will be provided, the pattern punches will be divided up between two or more stations in order to simplify the construction and maintenance of the dies and the necessary strippers will be provided. No attempt has been made to illustrate or describe these refinements, because their addition to the drawings and specification would serve only to make them unnecessarily voluminous.

The broad inventions defined in this specification and defined in the broader claims below were first disclosed in the specific forms of the invention described in my earlier patent application, Serial No. 129,326, filed on March 6, 1937. The application of which this specification is a part therefore stands as a division of that earlier application, as far as the broad inventions as well as some of the specific inventions are concerned, and it is known technically as a "continuation in part." The record date of the inventions defined in the broader claims is therefore March 6, 1937, even though some of the specific forms of those inventions were not invented until later.

I claim:

1. The method of making a filter stack which comprises stamping a series of identical patterns in a strip of stock, placing the patterns successively adjacent a stack assembling position and blanking them out of the stock to form cloverleaf washers with radiating lobes separated by gaps, transferring the washers to the assembling position one after the other, and rotating the portion of the stack in the assembling position a fraction of a revolution before each pattern is transferred to the assembling position so that the lobes of each washer lie above the gaps of the washer below.

2. A die set comprising means for blanking out at one station a series of similar cloverleaf washers, means for receiving each of the washers after it is blanked out and means for rotating the receiving means and the previously blanked out and received washers a fraction of a revolution after each washer is received and before the next washer is received.

3. A die set comprising means for repeatedly punching out a pattern in sheet stock, said pattern including an indexing portion, means for blanking out the portions of stock containing said pattern to form cloverleaf washers having radiating lobes separated by gaps, means for receiving the washers, the receiving means and the indexing portion of the pattern being shaped so that the washers can fit on the receiving means in at least two angularly related positions, and means for rotating the receiving means in synchronism with the operation of the blanking out means so that each washer is received with its lobes lying above the gaps of the preceding washer.

4. A die set for making a metal-edge filter stack formed of thin metal elements stacked in alternating sequence, comprising means for stamping patterns in sheet stock, means for blanking out the pattern-bearing portions of said stock and forming them into finished elements having all the same over-all diameter, and means for receiving the finished elements in alternate arrangement in a stack and for preventing them from rotating relative to each other after they are received in the stack, the distance between the means for stamping the pattern for any element and the means for blanking out that element being the same as the corresponding distance for every other element.

5. A die set as described in claim 4 and in which there is a single pattern stamping means, a single blanking means and a single element receiving means, and in which the element receiving means is carried by mechanism for rotating it about its axis so as to receive the stamped elements in alternating sequence, the difference between successive elements being merely a difference in orientation.

6. A device for assembling metal-edge filter stacks formed of identical cloverleaf washers having alternate lobes and gaps, the device including means for presenting successive washers of that type at a station, a receiving member near the station, the receiving member having such a shape that the washers can fit it in at least two angularly different positions, means for moving the washers one after another from the station to the receiving member, and means for causing relative rotation between the receiving member and the washer each time that a washer is moved to the receiving member.

7. A device for assembling metal-edge filter stacks formed of identical cloverleaf washers having alternate lobes and gaps, the device including means for presenting successive washers of that type at a station, a receiving member near the station, the receiving member having such a shape that the washers can fit it in at least two angularly different positions, the angle between the positions being equal to or an odd multiple of 180° divided by the number of lobes on each washer, means for moving the washers one after another from the station to the receiving member, and means for causing relative rotation between the receiving member and the washer through the angle defined above each time that a washer is moved to the receiving member so that the washers form a stack with the lobes of each washer lying in registry with the gaps of the washers immediately above and below.

8. A device as defined in claim 7 and in which the means for moving each washer from the station to the receiving member includes a blanking punch for separating the washer from the stock from which it is formed.

9. A device as defined in claim 7 and in which the means for causing the relative rotation between each washer and the receiving member includes mechanism for rotating the receiving member.

10. A device as defined in claim 7 and in which the means for moving each washer from the station to the receiving member includes a blanking punch for separating the washer from the stock from which it is formed, and in which the means for causing relative rotation between each washer and the receiving member includes mechanism for rotating the receiving member.

11. A device as defined in claim 7 and in which the means for causing relative rotation between each washer and the receiving member includes means for engaging and rotating the washer as it leaves the station and before it fits the receiving member.

12. A device as defined in claim 7 and in which the means for moving each washer from the station to the receiving means includes a blanking punch for separating the washer from the stock from which it is formed, and in which the means for causing relative rotation between each washer and the receiving means includes at least one lug projecting from the end of the blanking punch and adapted to engage the edge of the washer.

13. A device as defined in claim 7 and in which the means for moving each washer from the station to the receiving means includes a blanking punch for separating the washer from the stock from which it is formed, and in which the means for causing relative rotation between each washer and the receiving means includes a rotator carried by the blanking punch.

14. A device as defined in claim 7 and in which the means for moving each washer from the station to the receiving means includes a blanking punch for separating the washer from the stock from which it is formed, and in which the means for causing relative rotation between each washer and the receiving member includes a rotator carried by the blanking punch and having lugs projecting below the end of the blanking punch and adapted to engage the washer for turning it.

15. A device as defined in claim 7 and in which the means for presenting the successive washers to the station includes a magazine for holding a large number of completed washers in a stack with the lobes of each washer in line with the lobes of all of the other washers in the magazine.

16. A device as defined in claim 7 and in which the means for causing relative rotation between each washer and the receiving member includes means for engaging and rotating the washer as it lies in the station.

17. A device as defined in claim 7 and in which the means for causing relative rotation between each washer and the receiving member includes means for engaging the washer by its outer edge and for rotating it as it lies in the station.

18. A device as defined in claim 7 and in which the means for causing relative rotation between each washer and the receiving member includes a rotator having a flat portion no thicker than the washer, the flat portion having a hole into which the washer can fit.

19. A device as defined in claim 7 and in which the means for presenting successive washers at a station includes a magazine for holding a stack of washers, in which the means for causing relative rotation between each washer and the receiving member includes a thin plate at the bottom of the magazine with a non-circular hole in it to receive the washer, the thin plate being rotatable relative to the magazine, and in which the receiving member is formed to receive washers from the hole in the thin plate only when they are at an angle to their original position in the magazine.

20. Any method of making a metal-edge filter stack which includes the steps of successively presenting at a station a series of identical cloverleaf washers, moving each washer from the station to a partially formed stack of washers, and causing relative rotation between the washer and the partially formed stack before each washer is added to it.

21. Any method of making a metal-edge filter stack which includes the steps of successively presenting at a station a series of identical cloverleaf washers with radial lobes separated by gaps, moving each washer from the station to a partially formed stack of washers, and rotating at least every other washer before it is added to the partially formed stack, each washer being rotated differently from the washers immediately before and after, and the difference of rotation being equal to or an odd multiple of 180° divided by the number of lobes on each washer.

22. Any method as defined in claim 21 and in which the washers are blanked out at the station.

23. Any method as defined in claim 21 and in which the washers are presented at the station completely formed in advance.

24. The method of making a metal-edge filter stack which includes the steps of moving a single strip of thin sheet metal stock step by step past a plurality of stations, working the stock at the stations to form filter stack washers with radially extending spacing portions, all but the periphery of each washer being formed before the washer reaches the final station, and blanking out a completely formed washer at the final station after each movement of the stock, all of the washers being identical.

25. The method of making a metal-edge filter stack which includes the steps of moving a single strip of thin sheet metal stock step by step past a plurality of stations, working the stock at the stations to form filter stack washers with radially extending spacing portions and thereby completely forming all but the periphery of each washer before the washer reaches the final station, repeating the same forming operations at each station after each movement of the stock and thereby forming a series of identical washers having the same orientation in the stock, blanking out a completely formed washer at the final station after each movement of the stock, and receiving the washers in a stack at the final station.

PAUL HEFTLER.